(12) United States Patent
Jayaraman et al.

(10) Patent No.: US 9,015,727 B2
(45) Date of Patent: Apr. 21, 2015

(54) SHARING OPERATING SYSTEM SUB-PROCESSES ACROSS TASKS

(75) Inventors: Satya Jayaraman, Hyderabad (IN); Ashish Bajaj, Hyderabad (IN); Kuntal Dilipsinh Sampat, San Diego, CA (US); Sachin Chaturvedi, Hyderabad (IN); Balam Subhash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1398 days.

(21) Appl. No.: 12/061,607

(22) Filed: Apr. 2, 2008

(65) Prior Publication Data

US 2009/0254919 A1 Oct. 8, 2009

(51) Int. Cl.
G06F 9/46 (2006.01)
G06F 9/48 (2006.01)

(52) U.S. Cl.
CPC ..................... *G06F 9/4843* (2013.01)

(58) Field of Classification Search
None
See application file for complete search history.

(56) References Cited

U.S. PATENT DOCUMENTS

| 5,193,161 | A | * | 3/1993 | Bealkowski et al. | 711/206 |
|---|---|---|---|---|---|
| 5,727,211 | A | * | 3/1998 | Gulsen | 718/108 |
| 5,802,368 | A | | 9/1998 | Grigsby et al. | |
| 5,812,823 | A | | 9/1998 | Kahle et al. | |
| 6,286,025 | B1 | * | 9/2001 | Chang | 718/100 |
| 6,711,673 | B1 | * | 3/2004 | Mitchell et al. | 713/1 |
| 7,543,126 | B2 | * | 6/2009 | Lewis | 711/163 |
| 7,793,055 | B2 | * | 9/2010 | Beaman | 711/154 |
| 2005/0010911 | A1 | | 1/2005 | Kim et al. | |

FOREIGN PATENT DOCUMENTS

| CN | 1577268 A | 2/2005 |
|---|---|---|
| CN | 1732458 A | 2/2006 |
| CN | 1783015 A | 6/2006 |
| EP | 0766170 | 4/1997 |
| JP | 9198255 A | 7/1997 |
| JP | 9288586 A | 11/1997 |
| JP | 2007265228 A | 10/2007 |
| TW | 200515280 | 5/2005 |
| TW | 200739421 | 10/2007 |

OTHER PUBLICATIONS

"The SPARC Architecture Manual (Version .8)" Internet Citation, [Online] XP002363131 Retrieved from the Internet: URL:http://www.spare.org/standards/VS.pdf [retrieved on Jan. 1, 2006].

(Continued)

*Primary Examiner* — Gregory A Kessler
(74) *Attorney, Agent, or Firm* — Peter Michael Kamarchik; Nicholas J. Pauley; Joseph Agusta

(57) ABSTRACT

An operating system permits sharing of a sub-process (or process unit) across multiple processes (or tasks). Each shared sub-process has its own context. The sharing is enabled by tracking when a process invokes a sub-process. When a process invokes a sub-process, the process is designated as a parent process of the child sub-process. The invoked sub-process may require use of process level variable data. To enable storage of the process level variable data for each calling process, the variable data is stored in memory using a base address and a fixed offset. Although the based address may vary from process to process, the fixed offset remains the same across processes.

28 Claims, 4 Drawing Sheets

(56) References Cited

OTHER PUBLICATIONS

International Search Report—PCT/US2009/037933, International Search Authority—European Patent Office—Jul. 3, 2009.

Written Opinion—PCT/US2009/037933, International Search Authority—European Patent Office Jul. 3, 2009.

Taiwan Search Report—TW098110305—TIPO—Jun. 17, 2013.

* cited by examiner

SHARING OPERATING SYSTEM SUB-PROCESSES ACROSS TASKS

TECHNICAL FIELD

The present disclosure relates to operating systems. More specifically, the present disclosure relates to memory management by operating systems.

BACKGROUND

Often, applications share common functions. For example, a voice recorder application and a voice communication application both require a voice codec function. One way to permit both applications to have access to the same function is to employ shared libraries.

Shared libraries are collections of sub-programs that are shared among multiple programs. The multiple programs can simultaneously run the shared libraries, and thus shared libraries provide some advantages to programmers. However, some operating systems require shared libraries to always be resident in internal memory. In many computing systems, internal memory is a limited resource. When shared libraries are used, the limited resource (e.g. internal memory) becomes even more limited.

Shared libraries need to be reentrant. Their design imposes the reentrancy requirement because shared libraries use the addressing context of the calling program. Due to this, shared libraries execute in different virtual address spaces which they inherit from the calling program.

An alternative to shared libraries is to declare a full copy of the exact same function (e.g., declaring the memory map, input source files, etc.) in each application. Once declared in each application, the function can be overlapped, i.e., the same source code in memory can be used by each calling application.

Declaring the same function in each application and overlapping them has drawbacks, such as maintenance and wasted memory. For example, it is difficult to maintain the memory map because care has to be taken to ensure that any changes (such as, adding a new data variable to the function) are reflected across all functions. It is also error prone to remove the function's memory map from applications that no longer need the function. Moreover, each function requires its own data structures to enable the overlapping, and finally, extra memory is allocated toward each function.

It would be beneficial if multiple applications could more efficiently share the same copy of source code for a called function without needing to make the function reentrant.

SUMMARY

A system and method enable a sub-process, having its own context, to be shared among multiple processes. An operating system can track which processes have invoked the sub-process to enable return to a pre-empted process and any invoked sub-process. The sub-process need only be declared within a single process.

According to an aspect of the disclosure, a computer-readable medium stores an operating system that executes multiple processes and a sub-process. The sub-process is capable of being invoked by the processes. The sub-process had its own context.

According to another aspect, a mobile device includes a processor lacking hardware support for program counter (PC) relative addressing. The processor executes an operating system that enables sharing sub-processes across processes. Each sub-process has its own context.

In yet another aspect, a method is provided for sharing a sub-process across multiple processes. The method includes invoking a sub-process from multiple calling processes, the sub-process having its own context. The method also includes setting hardware base and length registers to the context of the sub-process. The method further includes setting hardware base and length registers to a context of each calling process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, wherein.

DETAILED DESCRIPTION

Figure 1:
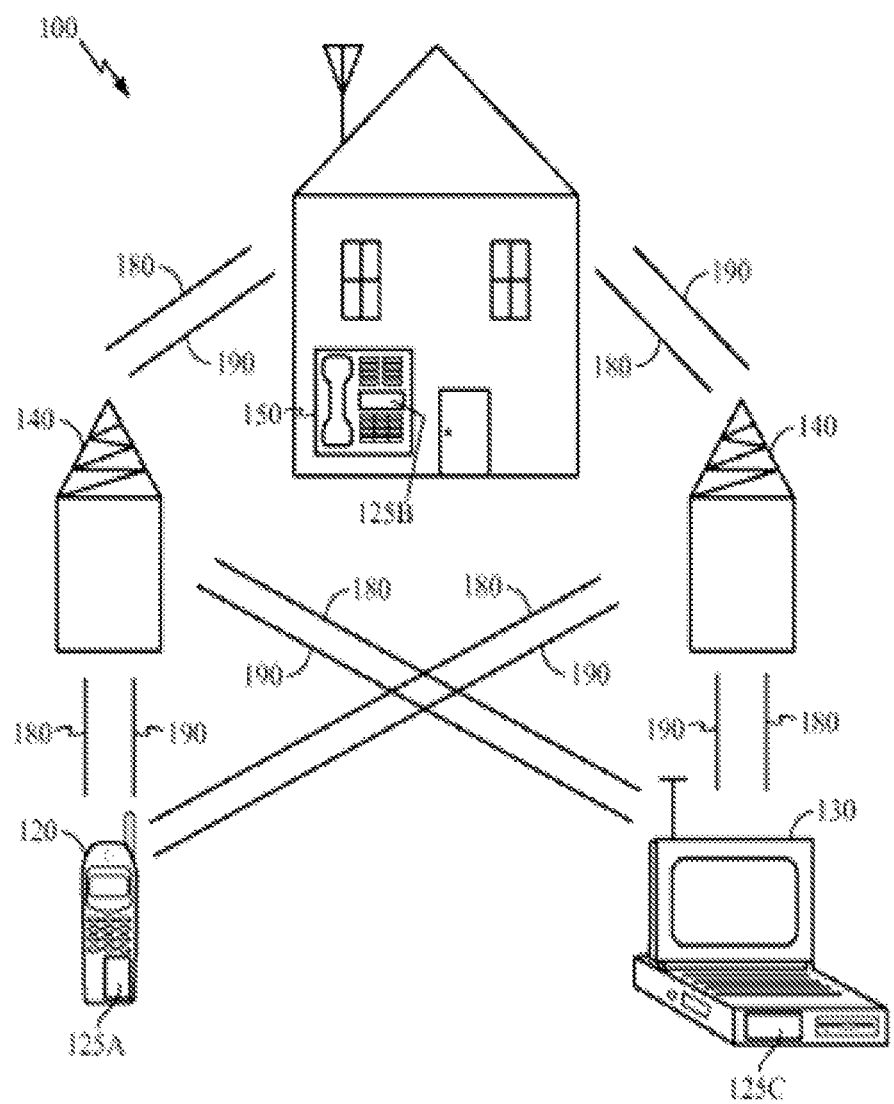
FIG. 1 is a block diagram showing an exemplary wireless communication system wherein an embodiment of the invention may be advantageously employed.

FIG. 1 shows an exemplary wireless communication system 100 wherein an embodiment of the invention may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include improved microprocessors 125A, 125B, and 125C, respectively, executing a real time operating system (RTOS), according to embodiments of the invention as discussed further below. FIG. 1 shows forward link signals 180 from the base stations 140 and the remote units 120, 130, and 150 and reverse link signals 190 from the remote units 120, 130, and 150 to base stations 140.

In FIG. 1, the remote unit 120 is shown as a mobile telephone, the remote unit 130 is shown as a portable computer, and the remote unit 150 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 1 illustrates remote units according to the teachings of the invention, the invention is not limited to these exemplary illustrated units. The invention may be suitably employed in any device which includes a microprocessor.

The microprocessor 125A, 125B, and 125C can include a set of instructions that can be executed to cause the microprocessor 125A, 125B, and 125C to perform any one or more of the methods or computer based functions disclosed herein.

As illustrated in FIG. 1, the remote units 120, 130, 150 may include a microprocessor 125A, 125B, and 125C, e.g., a central processing unit (CPU), a graphics processing unit (GPU), a digital signal processor (DSP) or each. Moreover, the remote units 120, 130, 150 can include an internal memory and an external memory that can communicate with each other via a bus. The remote units 120, 130, 150 may further include a video display unit, such as a liquid crystal display (LCD), an organic light emitting diode (OLED), a flat panel display, a solid state display, or a cathode ray tube (CRT). Additionally, the remote units 120, 130, 150 may include an input device, such as a keyboard, and a cursor control device, such as a track ball. The remote units 120, 130, 150 can also include a disk drive unit, a signal generation device, such as a speaker or remote control, and a network interface device, for example a wireless transceiver.

In a particular embodiment, as depicted in FIG. 1, the disk drive unit may include a computer-readable medium wherein one or more sets of instructions, (e.g., software) can be embedded. Further, the instructions may embody one or more of the methods or logic as described herein. In a particular embodiment, the instructions may reside completely, or at least partially, within an internal memory, and/or external memory during execution by the microprocessor 125A, 125B, 125C. The memory may include computer-readable media.

When the available memory of a microprocessor, such as any of the processors 125A, 125B, 125C, is too small to store a complete program, memory management of the present disclosure is employed. In one embodiment, the microprocessor 125A, 125B, 125C is a digital signal processor (DSP).

According to an aspect of the present disclosure, the memory management enables sub-processes to be shared across tasks (i.e., processes). A single sub-process can be used by other processes in the system, even though the single sub-process is only defined in a single process.

Processes are independently executing programs in a multi-tasking environment. Processes can represent distinct applications or multiple instances of a single application. Each process has it own individual virtual address space and can contain one or more sub-processes.

A sub-process is a process unit that is loaded and executed dynamically by a user application. A sub-process executes like a function call but has its own context, running in its own address space. A context consists of its own private address space. Generally speaking, the process level functionality is split into more than one sub-process.

Once loaded, a sub-process only needs to be in internal memory when its calling process is executing. If a sub-process gets swapped out by another process, the kernel reloads it when the calling process is awakened.

In some cases, a sub-process accesses operands that the calling process never sees. When the operands are only accessed by the sub-process, the operands are stored in an address space of the sub-process.

In other cases, a sub-process accesses operands of the calling process. According to an aspect of the present disclosure, these calling process operands are stored at a memory location belonging to the calling process, rather than a global location. As a result, another process cannot access the calling process' operands because of memory protection.

Each process thus has its own address space for operands being used by the shared sub-process. This calling process operand address space is defined by a base register address and an offset. In other words, the sub-process does not access calling process operands using absolute addresses. According to an aspect of the present disclosure, the offset is the same, across all the processes. Even if the base address is different for each process, each invoked sub-process can store its own values in its calling process operands as long as the offset is exactly the same within each calling process address space.

According to an aspect of the present disclosure, the offset is defined within the sub-process. The base address is determined by an operating system loader at build time using, in one embodiment, base length addresses selected from multiple base length address pairs. For example, three different base length address pairs can exist in the hardware design. The loader assigns one base length pair to processes. The loader assigns another base length pair to sub-processes, permitting the sub-processes to have their own context.

The base register indicates the start of the process (or sub-process) in physical address space. The addresses in the process (or sub-process) are then virtual addresses which are offsets from the base value. The length is used by the microprocessor to decide the maximum accessible offset for the process (or sub-process). If this space is exceeded, the hardware generates a disaster interrupt.

Any operands shared across all sub-processes belonging to one process are stored in the process level memory. If the operands are required only by this sub-process, then they are stored in the address space controlled by the sub-process' own base length pair. At build time, the loader pre-assigns the address space associated with the sub-process data operands, avoiding different set up for different processes.

In one embodiment, a sub-process is not required to be reentrant. Even in this embodiment, the microprocessor need not have hardware support for program counter (PC) relative addressing. However any common function invoked by a shared sub-process should be reentrant. In one embodiment, different processes concurrently call a sub-process that is written to be reentrant.

According to an aspect of the disclosure, sharing is enabled in part by data within a process control block of the process invoking the shared sub-process. A process control block stores a context of the process and contains the base length register values used by the process. According to this aspect of the disclosure, the operating system marks an invoked sub-process, within the calling process' process control block, as being run by this calling process. The operating system further marks the calling process as the current parent process in a data structure of the sub-process. Consequently, whenever the operating system switches out of the process context, executes another process, and returns to the first process, the operating system is aware of which particular sub-process was executing. Return to the pre-empted sub-process can occur. In another embodiment, the operating system includes a global data structure that indicates when a particular sub-process has become active. Multiple active sub-processes can be indicated in this global data structure.

As noted above, multiple base length register pairs exist; one of the pairs is used for the sub-process context and one of the pairs is used for the calling process context. If the operating system context switches out of the sub-process and later wants to return to the sub-process context, the operating system should know which base length values to use for the parent process context. In a sub-process related data structure, the operating system dynamically stores an indication of the current parent process; and the calling process' process control block stores an indication of the invoked sub-process. Thus, if a context is switching back to a preempted process, the operating system is aware of what values to set for the parent process context.

If sharing of sub-processes across tasks is not to occur, at build time an operating system would know for every process what it's child sub-processes are. For example, assume there are a total of 155 sub-processes supported in the operating system and one process only declared to have five sub-processes at compile time. In this case, the operating system need not track the remaining 150 sub-processes, only the five must be tracked. According to the sharing of sub-processes across tasks, described in the present disclosure, every process can potentially access all 155 sub-processes. Thus, storage (for example a bit mask) is provided in the process control block to indicate which sub-process is currently being run by this process.

Figure 2:
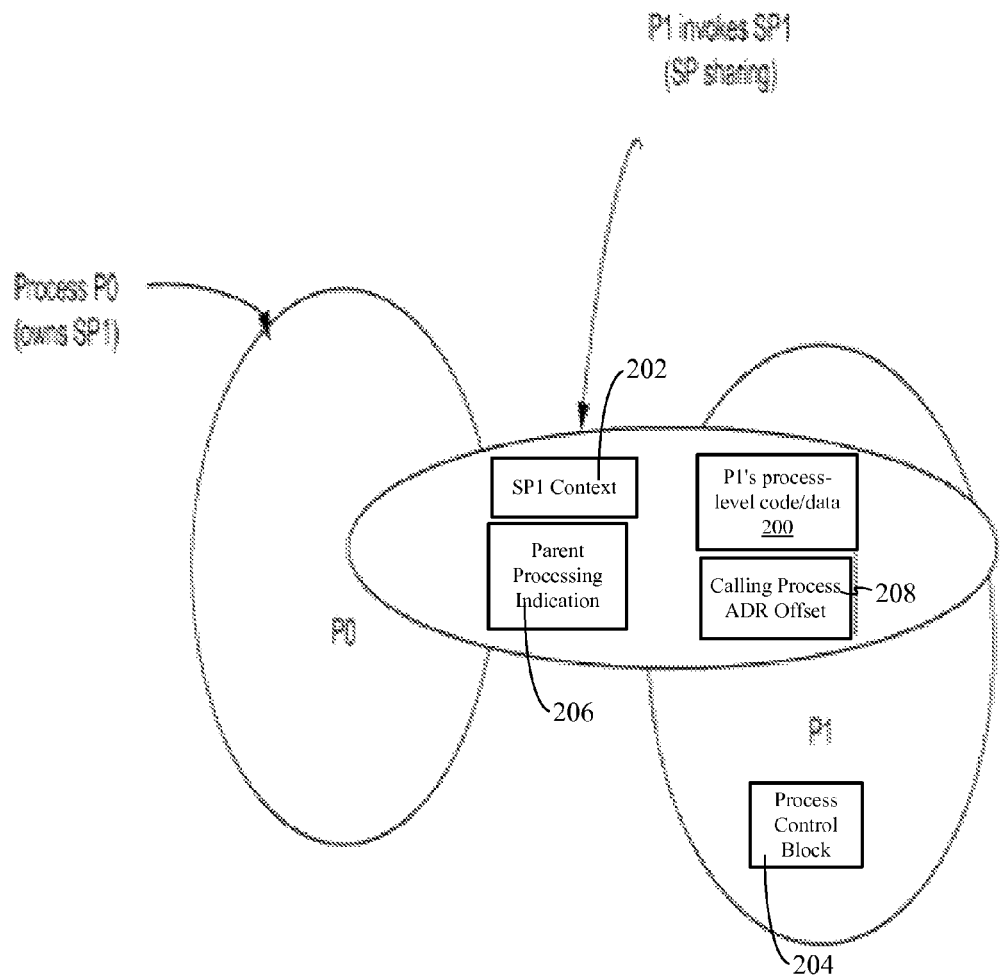
FIG. 2 is a Venn diagram showing processes sharing common sub-processes.

Referring to FIG. 2, an example of sharing a sub-process across tasks is now described. Processes P0 and P1 are depicted. Sub-process SP1 is also depicted and has its private code and data in its own context (box SP1), which does not intersect with either process P0 or P1. In this example, sub-process SP1 has been declared in process P0. Process P1 invokes sub-process SP1. The oval 210 indicates a dynamic call to the sub-process SP1. Thus, sub-process SP1 has its private code and data in its own context 202; and also has access to the code and data 200 of the calling process P1, which is within the domain of process P1.

According to the present disclosure, in the process control block 204 of processes P1, the invoked sub-process SP1 is indicated as a running. Moreover, within a data structure 206 of sub-process SP1, process P1 is indicated as the parent process. A global data structure is also updated to indicate that the sub-process SP1 has been invoked.

In this example, the sub-process SP1 will reference calling process operands at a base address plus an offset 208 in the context of process P1. The base address is assigned by the operating system. The offset is defined within each sub-process and is fixed across all processes. More specifically, when the sub-process is loaded into memory, fixed base addresses are also loaded, and defined by the operating system to ensure different memory locations for the calling process operands in each process, while permitting the offsets to remain the same for each context.

Figure 3:
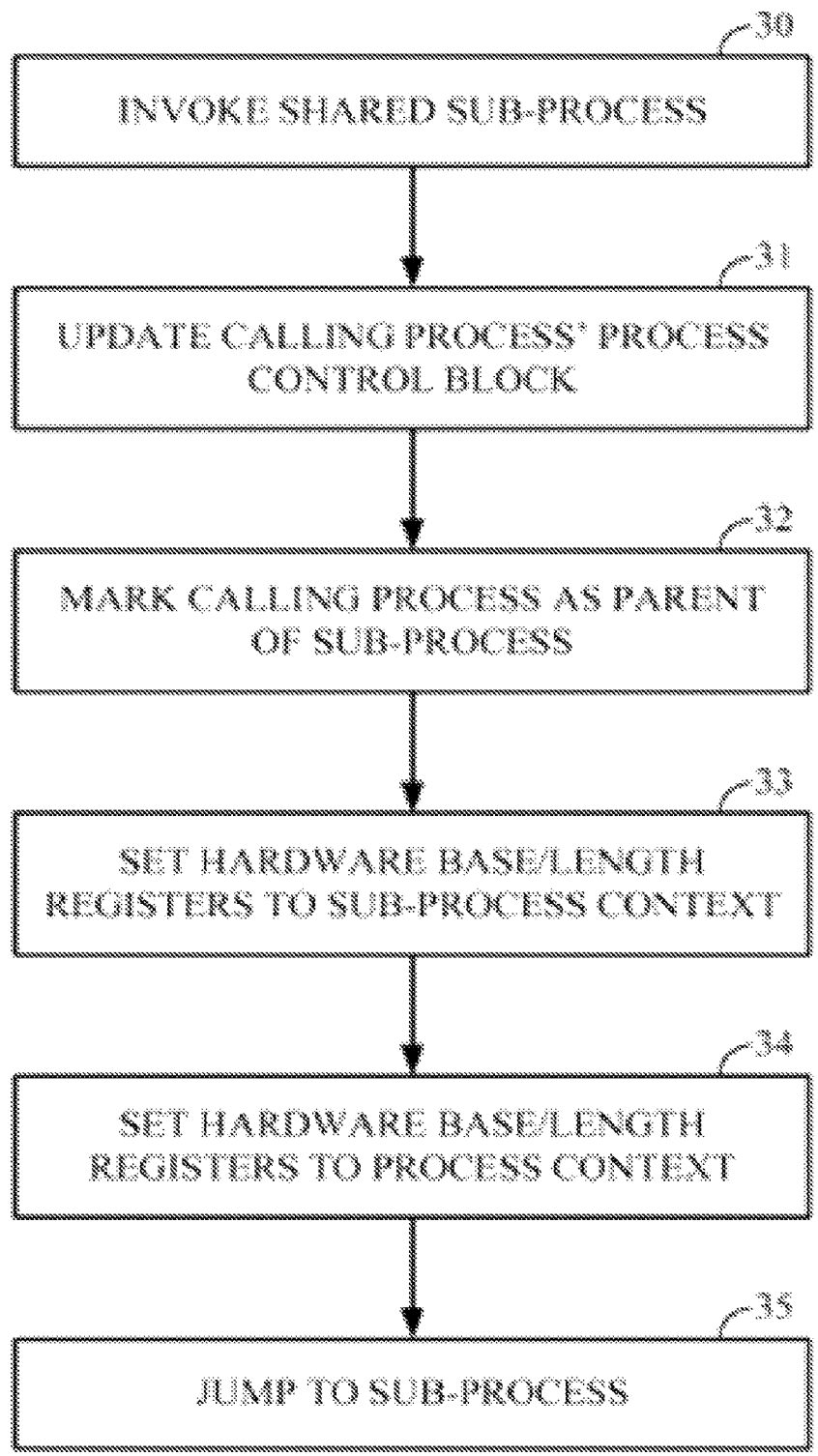
FIGS. 3 and 4 are flow diagrams showing exemplary methods for sharing sub-processes across multiple processes.

Referring now to FIG. 3, an exemplary logic flow will now be described.

Although not shown in the FIGs, initially a sub-process is declared within a single process. At process block 30, a process invokes a shared sub-process. The invoking process need not be the process wherein the sub-process was declared. Multiple different processes can call each sub-process.

At process block 31, the process control block of the calling process is updated to indicate which sub-process has been called. At process block 32, the calling process is designated as the parent process of the invoked sub-process in a data structure of the sub-process. In one embodiment, a global operand also stores an indication of which parent process invoked the sub-process.

At process block 33, hardware base and length registers are set to a sub-process context. This address space is available for operands that are exclusively used by the invoked sub-process. The marking enables the operating system to decide which base/length register values to use for the sub-process context.

At process block 34, hardware base and length registers are set to a calling process' context. This address space is available for operands that are used by both the calling process and the invoked sub-process. The marking enables the operating system to decide which base/length register values to use for the process context. In one embodiment, the address space is defined by a base address and a fixed offset. Although the base address can differ for each calling process, the fixed offset remains the same for each calling process. Finally, at process block 35, the operating system jumps to the shared sub-process.

Figure 4:
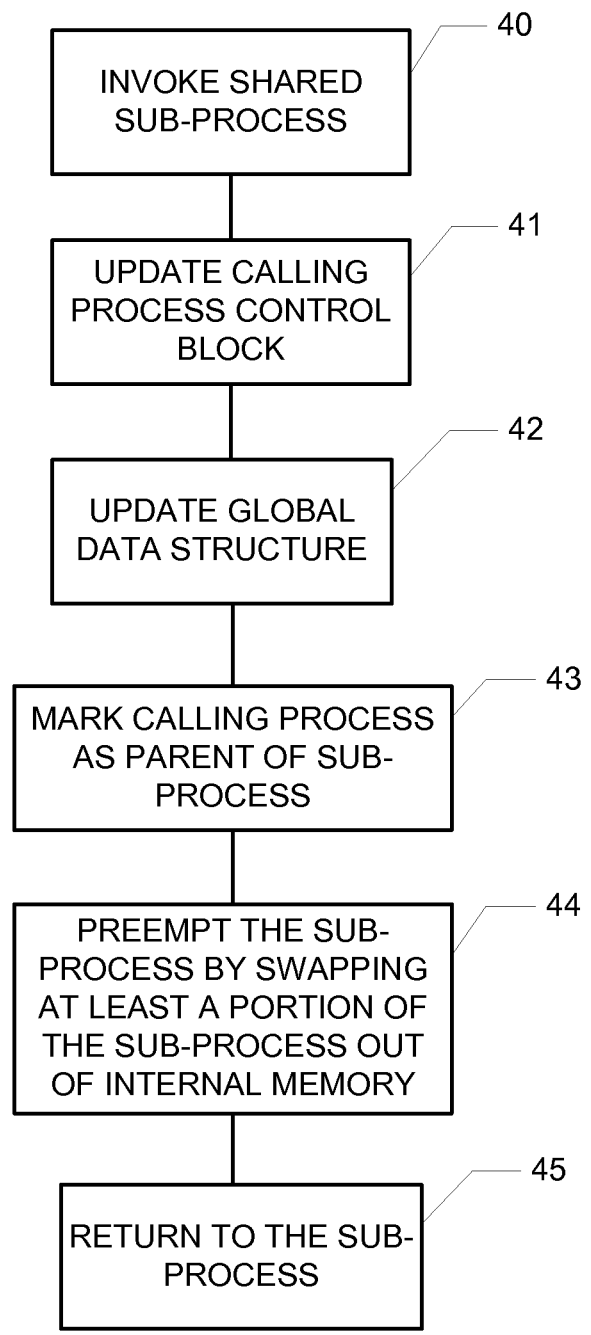

Another exemplary logic flow is described with reference to FIG. 4.

At process block 40, a process invokes a shared sub-process. The invoking process need not be the process in which the sub-process was declared. Multiple different processes can call each sub-process.

At process block 41, the process control block of the calling process is updated to indicate which sub-process has been called. At process block 42, a global data structure is updated to indicate the sub-process has become active. At process block 43, the calling process is designated as the parent process of the invoked sub-process in a data structure of the sub-process. At process block 44, the sub-process is preempted by swapping at least a portion of the sub-process out of internal memory. At process block 45, the operating system returns to the sub-process.

As a result of the present disclosure, sharing of sub-processes across multiple processes can be achieved. The sharing is enabled by proper address control of process level variable data and tracking which processes have invoked which sub-processes.

Although the present invention and its advantages have been described in detail, it should be understood that various changes, substitutions and alterations can be made herein without departing from the spirit and scope of the invention as defined by the appended claims. For example, although a read operation has been used in the discussion, it is envisioned that the invention equally applies to write operations. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-transitory computer-readable medium storing a computer program that enables sharing of sub-processes across processes, the medium comprising:
   an operating system code segment that executes a plurality of processes and a sub-process, the sub-process capable of being shared by the plurality of processes, the sub-process having its own context, the sub-process storing an address offset for calling process operands, the address offset being added to a base address to define an address space within a calling process context for the calling process operands.

2. The medium of claim 1, further comprising a process control block for each process, the process control block storing an indication of the sub-process once invoked by the respective process.

3. The medium of claim 1, wherein the sub-process is non-reentrant.

4. The medium of claim 1, wherein the sub-process is only declared within a single process.

5. The medium of claim 1, further comprising a sub-process related data structure that stores an indication setting the calling process as a parent process of the invoked sub-process.

6. The medium of claim 1, integrated into at least one of a music player, a video player, an entertainment unit, a navigation device, a communications device, a personal digital assistant (PDA), a fixed location data unit, and a computer.

7. A mobile device, comprising:
a processor lacking hardware support for program counter (PC) relative addressing, the processor executing an operating system that enables sharing sub-processes across processes, each sub-process having its own context, the sub-processes storing an address offset for calling process operands, the address offset being added to a base address to define an address space within a calling process context for the calling process operands.

8. The mobile device of claim 7, wherein the processor comprises a digital signal processor (DSP).

9. The mobile device of claim 7, wherein the operating system comprises data structures that enable the sharing, at least one of the data structures storing an indication of which process called an invoked sub-process.

10. A method for sharing a sub-process across a plurality of processes, the method comprising:
invoking a sub-process from a plurality of calling processes, the sub-process having its own context, the sub-process storing an address offset for calling process operands, the address offset being added to a base address to define an address space within a calling process context for the calling process operands;
setting hardware base and length registers to the context of the sub-process; and
setting hardware base and length registers to a context of each calling process.

11. The method of claim 10, further comprising declaring the sub-process only within a first process.

12. The method of claim 10, further comprising accessing the operands within the context of each calling process using the base address and a fixed offset.

13. The method of claim 10, further comprising updating a process control block of each calling process to indicate the sub-process has been invoked.

14. The method of claim 13, further comprising updating a global data structure to indicate the calling process is a parent of the sub-process.

15. The method of claim 13, further comprising updating a sub-process related data structure to indicate the calling process as a parent of the invoked sub-process.

16. The method of claim 15, further comprising:
preempting the sub-process; and
returning to the sub-process, in-part by determining the parent of the sub-process.

17. The method of claim 16, wherein preempting the sub-process further comprises swapping at least a portion of the sub-process out of internal memory.

18. The method of claim 10, further comprising executing the method in at least one of a music player, a video player, an entertainment unit, a navigation device, a communications device, a personal digital assistant (PDA), a fixed location data unit, and a computer.

19. An apparatus for sharing a sub-process across a plurality of processes, the apparatus comprising:
means for invoking a sub-process from a plurality of calling processes, the sub-process having its own context, the sub-process storing an address offset for calling process operands, the address offset being added to a base address to define an address space within a calling process context for the calling process operands;
means for setting hardware base and length registers to the context of the sub-process; and
means for setting hardware base and length registers to a context of each calling process.

20. The apparatus of claim 19, integrated into at least one of a music player, a video player, an entertainment unit, a navigation device, a communications device, a personal digital assistant (PDA), a fixed location data unit, and a computer.

21. A method for sharing a sub-process, the method comprising:
invoking a sub-process from a first calling process;
storing a sub-process specific address offset;
combining the sub-process specific address offset with a first base address to define a first address space within a context of the first calling process;
storing operands of the first calling process in the first address space;
invoking the sub-process from a second calling process;
combining the sub-process specific address offset with the second base address to define a second address space within a context of the second calling process; and
storing operands of the second calling process in the second address space.

22. The method of claim 21, further comprising:
updating a first process control block of the first calling process to indicate the sub process has been invoked from the first process; and
updating a second process control block of the second calling process to indicate the sub-process has been invoked by the second process.

23. The method of claim 22, further comprising:
updating a global data structure to indicate which of the first calling process and the second calling process is a parent of the sub-process.

24. The method of claim 21 further comprising executing the method in at least one of a music player, a video player, an entertainment unit, a navigation device, a communications device, a personal digital assistant (PDA), a fixed location data unit, and a computer.

25. An apparatus for mobile communication, comprising:
a memory; and
at least one processor coupled to the memory and configured:
to invoke a sub-process from a first calling process;
to store a sub-process specific address offset;
to combine the sub-process specific address offset with a first base address to define a first address space within a context of the first calling process;
to store operands of the first calling process in the first address space;
to invoke the sub-process from a second calling process;

to combine the sub-process specific address offset with the second base address to define a second address space within a context of the second calling process; and to store operands of the second calling process in the second address space.

26. The apparatus of claim 25, in which the at least one processor is further configured:

to update a first process control block of the first calling process to indicate the sub process has been invoked from the first process; and to update a second process control block of the second calling process to indicate that the sub-process has been invoked by the second process.

27. The apparatus of claim 25, in which the at least one processor is further configured to update a global data structure to indicate which of the first calling process and the second calling process is a parent of the sub-process.

28. The apparatus of claim 25, integrated into at least one of a music player, a video player, an entertainment unit, a navigation device, a communications device, a personal digital assistant (PDA), a fixed location data unit, and a computer.

* * * * *